(12) United States Patent
Fu et al.

(10) Patent No.: US 12,058,726 B2
(45) Date of Patent: Aug. 6, 2024

(54) COMMUNICATION METHOD AND APPARATUS

(71) Applicant: GUANGDONG OPPO MOBILE TELECOMMUNICATIONS CORP., LTD., Guangdong (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 388 days.

(21) Appl. No.: 17/564,035

(22) Filed: Dec. 28, 2021

(65) Prior Publication Data

US 2022/0124748 A1    Apr. 21, 2022

Related U.S. Application Data

(63) Continuation of application No. PCT/CN2019/116395, filed on Nov. 7, 2019.

(51) Int. Cl.
*H04W 72/566* (2023.01)
*H04W 72/543* (2023.01)

(52) U.S. Cl.
CPC ....... *H04W 72/569* (2023.01); *H04W 72/543* (2023.01)

(58) Field of Classification Search
CPC ... H04W 72/51; H04W 28/0226; H04W 4/40; H04W 4/023; H04W 4/70; H04W 72/02; H04W 76/15; H04W 88/06; H04L 47/125
USPC ................. 370/328, 329, 330, 331
See application file for complete search history.

(56) References Cited

U.S. PATENT DOCUMENTS

2022/0132491 A1*  4/2022  Zhang .................. H04W 72/51

FOREIGN PATENT DOCUMENTS

| CA | 3120199 A1 * | 10/2020 | ........... H04L 1/1812 |
|---|---|---|---|
| CN | 107949058 A | 4/2018 | |
| CN | 108207032 A | 6/2018 | |
| CN | 110324902 A | 10/2019 | |
| CN | 113647169 A * | 11/2021 | ........... H04L 1/1822 |

(Continued)

OTHER PUBLICATIONS

Extended European Search Report of the parallel EP Application No. 19951269.0 dated on Jun. 2, 2022.

(Continued)

*Primary Examiner* — David Q Nguyen
(74) *Attorney, Agent, or Firm* — Ladas & Parry, LLP

(57) ABSTRACT

The communication method provided by the embodiment of the present application includes: when a resource conflict occurs, the terminal device acquires the composition state of the MAC SDU and the MAC CE in the MAC PDU of each resource; the terminal device determines the resource transmission priority of each resource according to the composition state of the MAC SDU and the MAC CE; the terminal device performs resource transmission according to the resource transmission priority of each resource. By determining a resource transmission priority of each resource according to the composition state of the MAC SDU and the MAC CE and determining current transmitted resource when a resource conflict occurs, the Qos requirements of information transmission can be guaranteed when the resource conflict occurs.

18 Claims, 5 Drawing Sheets

(56) References Cited

FOREIGN PATENT DOCUMENTS

| WO | 2019185014 A1 | 10/2019 | |
|---|---|---|---|
| WO | 2021087907 A1 | 5/2021 | |
| WO | WO-2021081824 A1 * | 5/2021 | ............ H04W 72/10 |

OTHER PUBLICATIONS

Huawei, HiSilicon, SIA, "Prioritization issues for MAC CEs", R2-1913243, 3GPP TSG-RAN WG2 Meeting 107-Bis, Chongqing, China, Oct. 14-18, 2019, entire document.

Huawei, HiSilicon, "Solution for intra-UE prioritization", R2-1913241, 3GPP TSG-RAN WG2 Meeting#107bis, Chongqing, China, Aug. 14-18, 2019, entire document.

Huawei, HiSilicon, "Further discussion on NR SL and NR UL prioritization", R2-1913709,3GPP TSG-RAN WG2 Meeting #107 bis, ChongQing, China, Oct. 14-Oct. 18, 2019, entire document.

3GPP TS 36.321 V15.7.0 (Sep. 2019), "3rd Generation Partnership Project;Technical Specification Group Radio Access Network; Evolved Universal Terrestrial Radio Access (E-UTRA); Medium Access Control (MAC) protocol specification (Release 15)", entire document.

The first Office Action and search report of corresponding Chinese application No. 202111260718.0, dated Jan. 19, 2023.

The first Office Action of corresponding European application No. 19951269.0, dated Dec. 1, 2022.

International Search Report (ISR) dated Jul. 28, 2020 for Application No. PCT/CN2019/116395.

Written Opinion dated Jul. 28, 2020 for Application No. PCT/CN2019/116395.

3GPP TS 38.321 V16.3.0 (Dec. 2020), 3rd Generation Partnership Project; Technical Specification Group Radio Access Network; NR; Medium Access Control (MAC) protocol specification (Release 16).

Vivo. "Discussion on the PUSCH priority based on MAC CE" R2-1912323, Oct. 4, 2019(Oct. 4, 2019), section 2.

* cited by examiner

COMMUNICATION METHOD AND APPARATUS

CROSS-REFERENCE TO RELATED APPLICATIONS

This application is a continuation of International Application No. PCT/CN2019/116395, filed on Nov. 7, 2019, which is hereby incorporated by reference in its entirety.

TECHNICAL FIELD

The present application relates to the field of communication, and in particular to a communication method and apparatus.

BACKGROUND

In order to ensure the demand for delay and reliable transmission, time-sensitive network has been introduced in the 5G Industrial Internet of Things (IIoT), which may lead to overlapping resources.

When the overlapping resources exist, a resource with a prioritized transmission needs to be selected from the overlapping resources. At present, the priority of the first type of resource is usually set to be higher than the priority of the second type of resource in the prior art, so that the resource with higher priority is sent first.

However, it is only limited that the priority of the first type of resource is greater than the priority of the second type of resource, and various overlapping resources is not fully considered, thereby the quality of service (QoS) requirement of the service or information cannot be guaranteed.

SUMMARY

The present application provides a communication method and apparatus, the method can guarantee the QoS requirement of the service or information.

In a first aspect, the embodiment of the present application provides a communication method, including:
  acquiring, by a terminal device, a composition state of a medium access control (MAC) service date unit (SDU) and a MAC control element (CE) in a MAC protocol data unit (PDU) of each resource when a resource conflict occurs;
  determining, by the terminal device, a resource transmission priority of each resource according to the composition state of the MAC SDU and the MAC CE; and
  performing, by the terminal device, resource transmission according to the resource transmission priority of each resource.

In a second aspect, the embodiment of the present application provides a communication method, including:
  acquiring, by a terminal device, a resource transmission priority of each resource when a resource conflict occurs, wherein the resource transmission priority of each resource is a highest priority among a priority of a logical channel LCH carrying a medium access control (MAC) service date unit (SDU) included by the resource and/or a priority of a MAC control element (CE);
  performing, by the terminal device, resource transmission according to the resource transmission priority of each resource.

In a third aspect, the embodiment of the present application provides a communication apparatus, including:
  an acquiring module, configured to acquire a composition state of a medium access control (MAC) service date unit (SDU) and a MAC control element (CE) in a MAC protocol data unit (PDU) of each resource;
  a determining module, configured to determine a resource transmission priority of each resource according to the composition state of the MAC SDU and the MAC CE;
  a transmitting module, configured to perform resource transmission according to the resource transmission priority of each resource.

In a fourth aspect, the embodiment of the present application provides a communication apparatus, including:
  an acquiring module, configured to acquire a resource transmission priority of each resource when a resource conflict occurs, wherein the resource transmission priority of each resource is a highest priority among a priority of a logical channel LCH carrying a MAC SDU included by the resource and/or a priority of a MAC CE;
  a transmitting module, configured to perform resource transmission according to the resource transmission priority of each resource.

In a fifth aspect, the embodiment of the present application provides a terminal device, including: a transceiver, a processor, and a memory;
  the memory stores computer-executable instructions;
  the processor executes the computer-executable instructions stored in the memory, so that the processor executes the communication method according to the first aspect.

In a sixth aspect, the embodiment of the present application provides a terminal device, including: a transceiver, a processor, and a memory;
  the memory stores computer-executable instructions;
  the processor executes the computer-executable instructions stored in the memory, so that the processor executes the communication method according to the second aspect.

In a seventh aspect, the embodiment of the present application provides a computer-readable storage medium, where the computer-readable storage medium stores computer instructions thereon, and when a processor executes the computer instructions, the communication method according to the first aspect is implemented.

In an eighth aspect, the present application provides a computer-readable storage medium, where the computer-readable storage medium stores computer instructions thereon, and when a processor executes the computer instructions, the communication method according to the second aspect is implemented.

The communication method provided by the embodiment of the present application includes: when a resource conflict occurs, the terminal device acquires the composition state of the MAC SDU and the MAC CE in the MAC PDU of each resource; the terminal device determines the resource transmission priority of each resource according to the composition state of the MAC SDU and the MAC CE; the terminal device performs resource transmission according to the resource transmission priority of each resource. By determining a resource transmission priority of each resource according to the composition state of the MAC SDU and the MAC CE and determining current transmitted resource when a resource conflict occurs, the Qos requirements of information transmission can be guaranteed when the resource conflict occurs.

DESCRIPTION OF EMBODIMENTS

Figure 1:
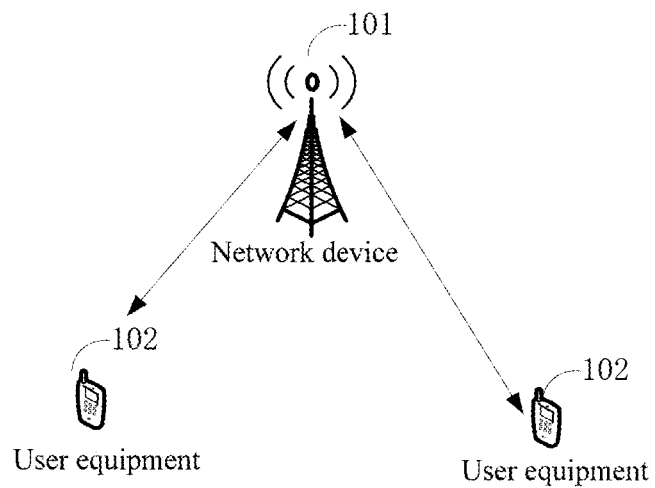
FIG. 1 is a schematic diagram of a system for a communication method provided by an embodiment of the present application.

First, the system architecture to which a communication method provided in the present application is applied is briefly described with reference to FIG. 1. FIG. 1 is a schematic diagram of a system for the communication method provided in an embodiment of the present application, as shown in FIG. 1:

including a network device 101 and a user equipment 102.

The network device 101 is an equipment with wireless transceiver function, including but not limited to: a evolutional Node B (eNB or eNodeB) in long term evolution (LTE), a base station (gNodeB or gNB) or a transmission receiving point/a transmission reception point (TRP) in new radio (NR) technology, a base station in subsequent evolution system, an access node in wireless fidelity (WiFi) system, a wireless relay node, a wireless backhaul node, etc. The base station may be a macro base station, a micro base station, a pico base station, a small station, a relay station, or a balloon station, etc. The multiple base stations may support the network of the same technology mentioned above, or the networks of different technologies mentioned above. The base station may contain one or more co-site or non-co-site TRPs. The network device may also be a wireless controller, a centralized unit (CU), and/or a distributed unit (DU) in a cloud radio access network (CRAN) scenario. The network device may also be a server, a wearable equipment, or a vehicle-mounted equipment. The following takes the network device as a base station as an example for description. The multiple network devices may be the base stations of the same type, or the base stations of different types. The base station may communicate with the terminal, or may communicate with the terminal through a relay station. The terminal may communicate with the multiple base stations of different technologies. For example, the terminal may communicate with a base station that supports LTE network, or may communicate with a base station that supports 5G network. And the terminal may support dual-connectivity with a base station of LTE network and a base station of 5G network, and may also support dual-connectivity with the base stations of 5G network base stations, etc.

The user equipment (UE) 102 is an equipment with wireless transceiver function. The user equipment may be deployed on land, including indoor or outdoor, handheld, wearable, or vehicle-mounted; it may also be deployed on water (such as ships, etc.); it may also be deployed in the air (such as airplanes, balloons, and satellites, etc.). The user equipment may be a mobile phone, a pad, a computer with wireless transceiver function, a virtual reality (VR) user equipment, an augmented reality (AR) user equipment, a wireless terminal in industrial control, a vehicle-mounted user equipment, a wireless terminal in self-driving, a wireless user equipment in remote medical, a wireless user equipment in smart grid, a wireless user equipment in transportation safety, a wireless user equipment in smart city, a wireless user equipment in smart home, a wearable user equipment, etc. The user equipment involved in the embodiments of the present application may also be referred to as a terminal, a user equipment (UE), an access user equipment, a vehicle-mounted terminal, an industrial control terminal, a UE unit, a UE station, a mobile station, a mobile platform, a remote station, a remote user equipment, a mobile equipment, a UE user equipment, a wireless communication equipment, a UE agent or a UE apparatus, etc. The user equipment may also be fixed or mobile.

It is worth noted that the technical solution shown in the present application may be applied to the 5th generation mobile communication technology (referred to as 5G) system, or may be applied to the long term evolution (LTE) system (such as, vehicle to X (V2X) system, device to device (D2D) system, machine type communication (MTC) system, etc. in the LTE communication system), or may also be applied to the universal mobile telecommunications system (UMTS) terrestrial radio access network (UTRAN) system, or global system for mobile communication (GSM)/enhanced data rate for GSM evolution (EDGE) system's radio access network (GERAN) architecture. The technical solution shown in the present application may also be applied to the other communication systems, such as an evolution communication system of 5G system, etc. the present application does not limit this, as long as the communication system includes a network device and a user equipment, where the network device and the user equipment may interact with each other through wireless signals.

Specifically, in a wireless communication system, such as a new radio (NR) communication system, information interacted between the user equipment and the network device is carried through a physical channel. Among them, the data sent by the user equipment, i.e. the uplink data, is usually carried through a physical uplink shared channel (PUSCH); the control information sent by the user equipment, i.e. the uplink control information, is usually carried through a physical uplink control channel (PUCCH). In addition, the user equipment may also send a sounding reference signal (SRS), and the network device may estimate the channel quality of the user equipment at different frequencies by receiving the SRS of the user equipment. Accordingly, the data sent by the network device to the user equipment can be referred to as the downlink data.

Referring to FIG. 1, the network device 101 and the user equipment 102 may form a communication system. In the communication system, the user equipment 102 may send the uplink data to the network device 101, and the network device 101 may send the downlink data to the user equipment 102. It can be understood that the specific numbers of the network device 101 and the user equipment 102 may be determined according to the actual scenarios, and FIG. 1 is only an exemplary illustration.

With the continuous development of 5G, 5G IIoT needs to support the transmission of Factory automation, Transport Industry, Electrical Power Distribution and other services in the 5G system, these services have certain requirements for delay and reliability of the transmission. Therefore, time sensitive network (TSN) is introduced in 5G IIoT, where the TSN is Ethernet protocol that is applied to various low-latency supported and time-based synchronization data transmission.

In order to ensure low latency and reliable transmission, there is a high probability that the following situation will occur: the resources configured for the user conflict in time, that is, the time domain resource occupied by the first data and the time domain resource occupied by the second data may overlap. Specifically, the resource may be used for the data transmission of data type through the data channel, and may also be used for the data transmission of control type through the control channel. It can be understood that the conflict in time mentioned in the context may be the conflict between the data channel and the data channel, the conflict between the data channel and the control channel (or the uplink control information (UCI)).

The following takes the conflict between the data channel and the data channel as an example to briefly explain the conflict of resources. The conflict between the data channel and the control channel is because the priority of the resource in the control channel is determined, only the priority of the data channel needs to be determined, so the implementation of which is similar to the implementation of the data channel and the data channel, and it will not be repeated below.

Specifically, the following possible scenarios exist for the resource conflict between the data channel and the data channel:

1. conflict between dynamic grant (DG) and DG
2. conflict between configured grant (CG) and DG
3. conflict between CG and CG Here is a brief description of CG and DG.

Specifically, in NR, the network device may send an uplink grant to the UE, thereby the uplink resource may be configured for the UE to perform uplink transmission. It is worth to note that the uplink grant may include CG and DG.

DG is configured by the network device according to the request of the UE. That is, first the UE sends a request to the network device, where the sent request may be, for example, an uplink scheduling request (SR), a random access channel (RACH) request or a buffer status report (BSR), the network device configures a DG for the UE according to the request of the UE, thereby the dynamic resource configuration is realized, so that the UE may use the DG to send the data.

In the embodiment, the data transmitted through DG may include cell-radio network temporary identifier (C-RNTI)/CS-RNTI scheduled data, or may also include dynamic scheduling data in random access response (RAR), or may also include the uplink data scheduled with temporal cell-radio network temporary identifier (TC-RNTI) in the fourth step message (that is, the retransmission of the scheduling message 3 (msg3)), the embodiment does not particularly limit the data transmitted through the DG, which can be selected according to actual needs.

CG is pre-configured by the network device without requiring the UE to request, that is, the network device may pre-configure the resource for the UE without the request of the UE, so that the UE may use the CG directly to send the uplink data without requesting.

Based on the above introduction, it can be understood that DG and CG are two different resource forms. DG is the resource dynamically allocated by the network device according to the request of the UE, and CG is resource pre-configured by the network device for the UE, which does not require the request of the UE. UE can transmit through CG or DG during uplink transmission. It can be understood that DG and CG correspond to resource blocks transmitted in PUSCH, and CG or DG may be the configuration resource transmitted on the uplink, or the configuration resource transmitted on the sidelink.

Specifically, in order to ensure the low latency and reliability of the data transmission, when data is transmitted through DG, and when data transmission is through CG, the time domain resources occupied may overlap, as well as the time domain resources occupied by CG and CG may overlap, and the time domain resources occupied by DG and DG may also overlap, that is, the three different scenarios listed above.

When the resource conflict occurs, it is necessary to select the resource with a prioritized transmission among the conflicting resources, so as to realize the smooth transmission of the data carried by the resource. The prior art has not yet determined how to select the resource with a prioritized transmission, therefore the present application provides a communication method to realize the selection of the resource with a prioritized transmission when the resource conflict occurs.

Before specifically introducing the communication method provided by the present application, the protocol involved in the UE and the specific format of the transmitted data under the protocol will be described in detail with reference to FIG. 2 first, because the following introduction will involve the specific format of the first data and the second data.

Figure 2:
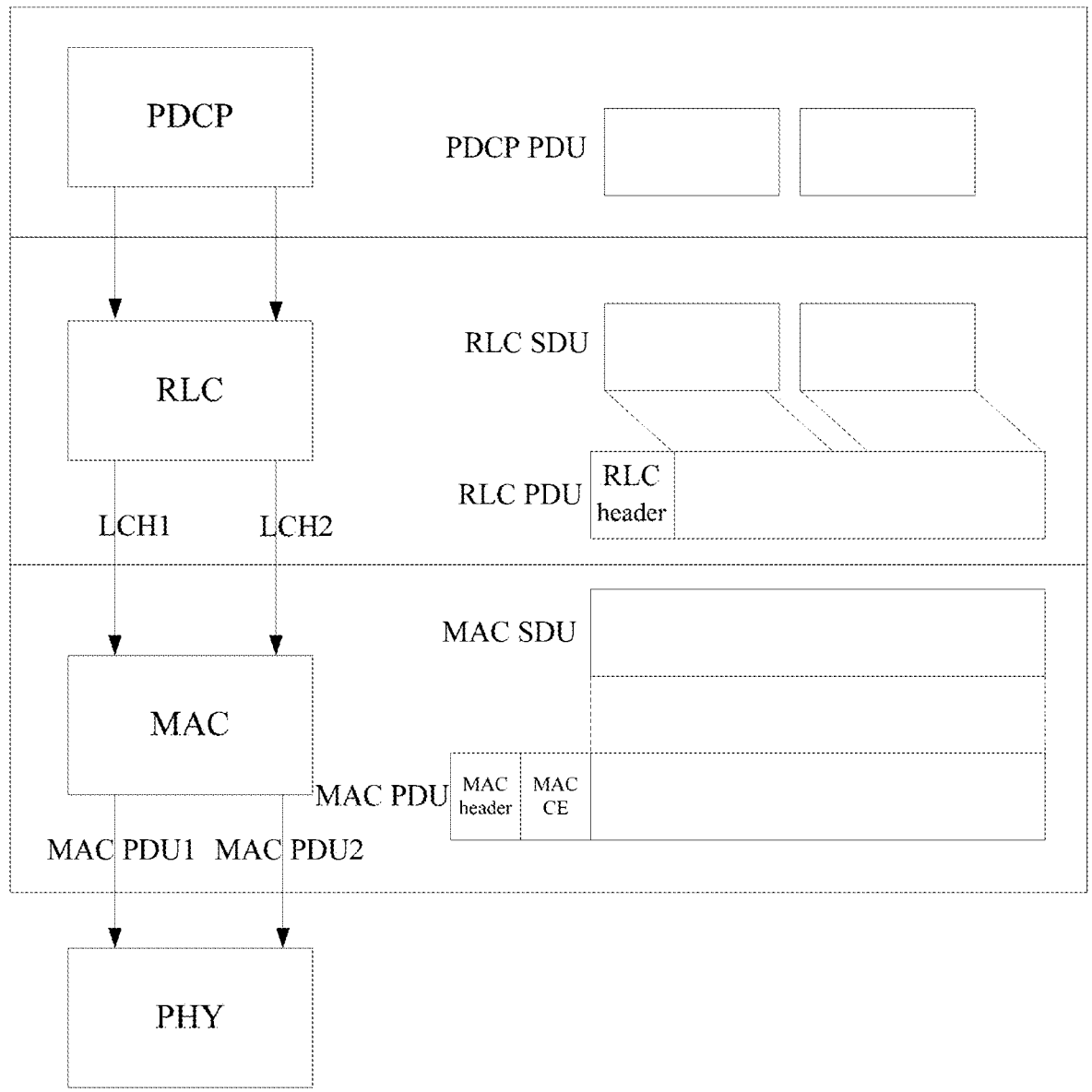
FIG. 2 is a schematic diagram of a protocol layer provided by an embodiment of the present application.

The protocol involved in the UE is introduced with reference to FIG. 2. FIG. 2 is a schematic diagram of a protocol layer provided by an embodiment of the present application.

As shown in FIG. 2, the UE may include multiple protocol layers, including but not limited to packet data convergence protocol (PDCP) layer, radio link control (RLC) layer, medium access control (MAC) layer and physical (PHY) layer.

The PDCP layer may include a PDCP entity to receive the uplink data from an upper layer (for example, a radio resource control (RRC) layer or an application layer) via a data radio bearer (DRB), and package the uplink data then send it to the RLC layer; the RLC layer may include a RLC entity to receive the uplink data from the PDCP layer and send the data to a media access control (MAC) layer via a logical channel (LCH); the MAC layer may include a MAC entity which is used to schedule/multiplex the data and send the MAC protocol data unit (PDU) to the physical layer. Further, the uplink data is sent from the physical layer of the UE to the physical layer of the network device, so as to realize the uplink transmission of the data.

In the RLC layer, multiple LCHs may be included, and each LCH corresponds to an RLC entity. As shown in FIG. 2, it is assumed that there are LCH1 and LCH2, where LCH1 is used to transmit RLC entity 1, and LCH2 is used to transmit RLC entity 2. After receiving the RLC entity 1 and RLC entity 2, the MAC layer packages the data to acquire MAC PDU1 and MAC PDU2, and then sends MAC PDU1 and MAC PDU2 to the physical layer, which is then sent by the physical layer of the UE to the physical layer the network device, so as to realize the uplink transmission of the data.

Next, service data unit (SDU) and PDU will be briefly described with reference to FIG. 2. Specifically, the SDU may also be referred to as the business data unit. In the protocol layer, the received data sent by the upper protocol is the SDU. Then the current protocol layer packages the received SDU to acquire a PDU, so that the data is sent through the PDU. The specific operation of the packaging may include adding the header information, adding the padding information, and so on. The SDU is an information unit from a high-layer protocol that is transmitted to a low-layer protocol, the SDU of the N layer and the PDU of the N−1 layer have a one-to-one correspondence. The concept of the SDU and the PDU can be understood with reference to FIG. 2.

At the same time, it can be understood that if the upper layer has no data to be transmitted, for example, the RLC PDU is empty, the corresponding MAC SDU is also empty. At present, when data is being transmitted, the data of the MAC layer does not include the MAC SDU, the data of the MAC layer may not include the MAC control element (CE), so that only the MAC header and/or the MAC CE and/or padding will be transmitted. And, one MAC PDU may include multiple MAC CEs, and may also include multiple MAC SDUs.

In the embodiment, the data may be transmitted through DG and/or CG. Based on the above introduction, it can be understood that DG and/or CG may include only MAC CE, or may include only MAC SDU, or may include MAC CE and MAC SDU at the same time.

It is worth noted that, for example, only one MAC SDU is illustrated in FIG. 2. If the MAC SDU illustrated in FIG. 2 is transmitted through LCH1, the logical channel corresponding to the MAC SDU is LCH1; if it is transmitted through LCH2, the logical channel corresponding to the MAC SDU is LCH2.

After introducing the concepts of MAC PDU, MAC SUD, and MAC CE, three possible implementations of the first priority and the second priority are introduced below with reference to the specific embodiments.

Figure 3:
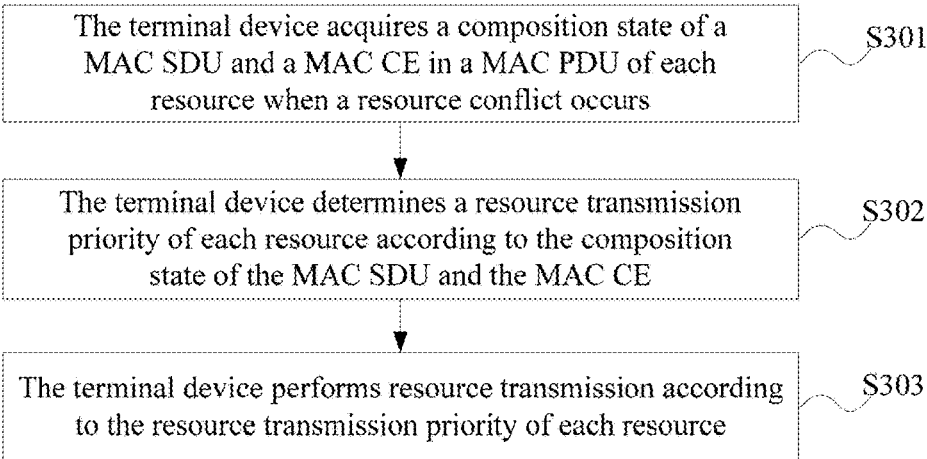
FIG. 3 is a first flowchart of a communication method provided by an embodiment of the present application.

First, a possible implementation is introduced with reference to FIG. 3. FIG. 3 is a first flowchart of a communication method provided by an embodiment of the present application.

As shown in FIG. 3, the method includes:

S301, the terminal device acquires a composition state of a MAC SDU and a MAC CE in a MAC PDU of each resource when a resource conflict occurs.

In the embodiment, data is sent through the resource bearer. Specifically, during the process of data transmission through the resource, resource conflict may occur. In the possible implementation, it may be the time domain corresponding to the first resource overlaps with the time domain corresponding to the second resource. The time domain resource may include frame, subframe, slot, and symbol. Specifically, in the long term evolution (LTE) system, uplink and downlink data are transmitted in a unit of subframe or transmission time interval (TTI) during transmission.

It is worth noted that the frame number ranges from 0 to 1023, the subframe number within a frame ranges from 0 to 9, and the slot number range within a frame are different in NR and LTE.

In the present application, the types of resources include at least: CG resource and DG resource.

Figure 4:
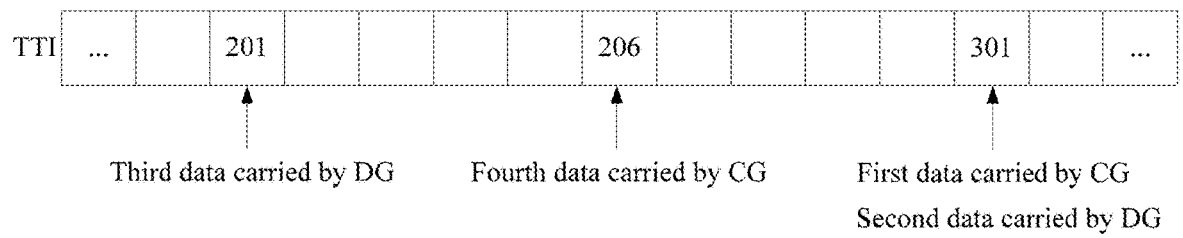
FIG. 4 is a schematic diagram of a time domain resource provided by an embodiment of the present application.

On the basis of the above introduction, in order to further explain the meaning of resource conflict, the time domain resource will be described in further detail below based on TTI with reference to FIG. 4. FIG. 4 is a schematic diagram of time domain resource provided by an embodiment of the present application.

As shown in FIG. 4, assuming that there is a TTI, the third data carried by DG is transmitted at TTI201, and the fourth data carried by CG is transmitted at TTI206. It can be determined that the time domain corresponding to the third data and the fourth data do not overlap, and referring to FIG. 4, it can be determined that the first data carried by the CG and the second data carried by the DG need to be transmitted at the same time at the TTI301, then it can be determined that the first resource conflicts with the second resource.

Based on the above introduction, those skilled in the art can understand that the UE in the present application needs to determine whether the resource conflict occurs first. The following describes a possible implementation for the UE to determine whether the resource conflict occurs.

The UE receives the CG configuration, and determines that t1 is the first time domain resource available for the CG according to the CG configuration. The UE receives the downlink control information (DCI) scheduling, and determines t2 is the second time domain resource available for the DG according to the DCI scheduling. If it is determined that t1 is equal to t2, it can be determined that the first resource conflicts with the second resource.

Specifically, the above description is based on the CG resource and the DG resource as an example, for example, it may determine the CG1 conflicts with CG2 according to the first CG configuration and the second CG configuration; or, it may determine the DG1 conflicts with DG2 according to the first DCI scheduling and the second DCI scheduling, the implementation is similar. The following example will take the conflict between CG and DG as an example to introduce, the implementation of other situations may refer to the following example, and will not be repeated.

The terminal device may only complete the transmission of a single resource at the same time. Therefore, in the embodiment, it is necessary to acquire the composition state of the MAC SDU and the MAC CE in the MAC PDU of each resource to determine which data is currently being transmitted.

According to the above introduction, it can be determined that the MAC PDU of each resource may include MAC SDU and MAC CE. The composition state of MAC SDU and MAC CE of any resource may be as follows: only MAC SDU included, only MAC CE included, MAC SDU and MAC CE both included.

S302, the terminal device determines a resource transmission priority of each resource according to the composition state of the MAC SDU and the MAC CE.

Specifically, the composition states of the MAC SDU and the MAC CE include the three listed above. The resource transmission priority corresponding to each composition state may be selected according to actual needs. For example, if only the MAC SDU is included, the resource transmission priority of each resource is determined according to the priority of the logical channel corresponding to the MAC SDU, which is not limited in the embodiment.

S303, the terminal device performs resource transmission according to the resource transmission priority of each resource.

When the resource transmission priority of the respective resource has been determined, the terminal device may transmit the resource with the highest priority.

It can be understood that, for the second data and/or the first data that are not transmitted, the UE may discard the data, or put the data into a buffer queue and then send it later.

The communication method provided by the embodiment of the present application includes: when a resource conflict occurs, the terminal device acquires the composition state of the MAC SDU and the MAC CE in the MAC PDU of each resource; the terminal device determines the resource transmission priority of each resource according to the composition state of the MAC SDU and the MAC CE; the terminal device performs resource transmission according to the resource transmission priority of each resource. By determining a resource transmission priority of each resource according to the composition state of the MAC SDU and the MAC CE and determining current transmitted resource when a resource conflict occurs, the Qos requirements of information transmission can be guaranteed when the resource conflict occurs The following describes several possible implementations for the terminal device determines the resource transmission priority of each resource according to the composition state of the MAC SDU and the MAC CE.

In a possible implementation (the composition state of each resource is "MAC SDU" or "MAC SDU+MAC CE").

When it is determined that each resource includes MAC SDU, the terminal device determines the resource transmission priority of each resource according to the channel priority of the logical channel LCH carrying the MAC SDU.

Where each resource includes MAC SDU, that is no matter whether the current resource includes MAC CE or not, as long as each resource includes MAC SDU, the terminal device determines the resource transmission priority of the respective resource according to the channel priority of the logical channel (LCH) carrying the MAC SDU.

Specifically, assuming that there are a first resource and a second resource, the specific implementation may be:
when it is determined that the first priority of the LCH carrying the MAC SDU corresponding to the first resource is higher than the second priority of the LCH carrying the MAC SDU corresponding to the second resource, the terminal device determines that the first transmission priority of the first resource is higher than the second transmission priority of the second resource.

Figure 5:
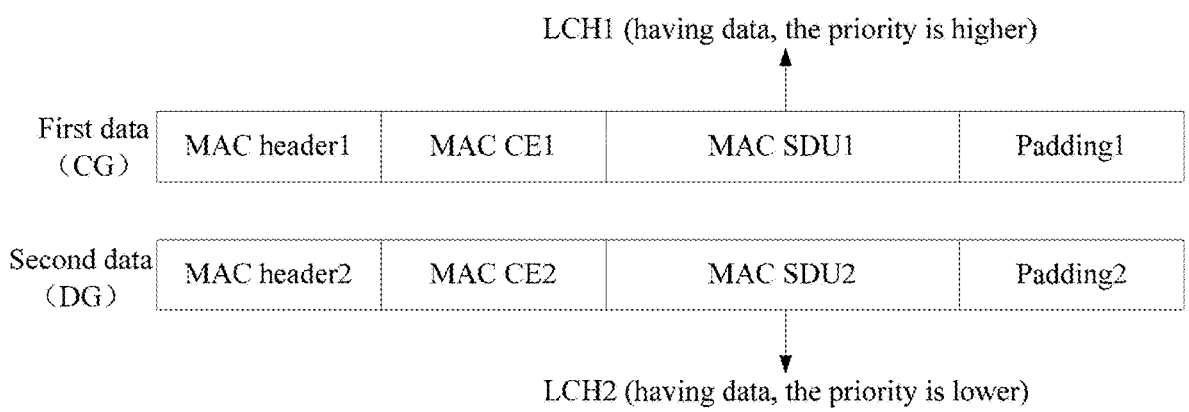
FIG. 5 is a first schematic diagram of resource transmission provided by an embodiment of the present application.

The following describes the implementation in the embodiment with a specific example with reference to FIG. 5. FIG. 5 is a first schematic diagram of resource transmission provided by an embodiment of the present application.

Assuming that there are a first resource CG and a second resource DG currently, where the first resource CG is used to transmit a first data, and the second resource DG is used to transmit a second data. Specifically, the first data corresponds to LCH1, and the second data corresponds to LCH2, and both LCH1 and LCH2 have data to be transmitted, which indicates that both the first data and the second data include MAC SDU currently. At this time, the first priority is the priority of LCH1, and the second priority is the priority of LCH2. In the example, because the priority of LCH1 is higher than the priority of LCH2, the resource with a prioritized transmission is CG, correspondingly, the first data will be preferentially transmitted through CG.

In other words, the situation introduced in the embodiment refers to that when both LCH1 and LCH2 have data to be transmitted, which indicates that both the first data and the second data include MAC SDU. At this time, the first priority is the priority of the first logical channel, and the second priority is the priority of the logical channel corresponding to the second MAC SDU.

It is worth noted that the FIG. 5 is only an exemplary illustration by taking the first resource and the second resource as an example. When two or more resources conflict, the implementation is similar, and will not be repeated here.

In another possible implementation (determining that the MAC SDU is not included in at least one of the resource).

Specifically, when it is determined that the MAC SDU is not included in at least one resource, the terminal device determines the resource transmission priority of the respective resource according to the composition state of the MAC SDU and the MAC CE includes:
the terminal device determines the resource transmission priority of the respective resource according to a preset rule.

The preset rule may be, for example, determining according to the priority of the MAC CE; or determining according to the priority of the logical channel corresponding to the MAC SDU, which is not limited in the embodiment, and it may be selected according to actual requirements.

Taking a first resource and a second resource as an example, it is assumed that the first resource includes a first MAC SDU and the second resource does not include MAC SDU; or the first resource does not include the first MAC SDU, and the second resource includes the MAC SDU; or, the first resource does not include the first MAC SDU, and the second resource does not include the MAC SDU;
if the terminal device determines that the priority of the first resource is higher than or equal to the priority of the second resource according to the preset rule or by UE itself, the terminal device transmits the first resource.

In the example, the preset rule or UE directly indicates whose priority is higher.

For example, LCH1 may be transmitted in CG, LCH2 may be transmitted in DG, and LCH1 has a higher priority than LCH2. Since there is no LCH which has data to be transmitted on the DG, only MAC CE and/or padding may be transmitted. Then, which resource is preferentially transmitted with priority depends on the implementation of the UE, for example, the UE determines to preferentially transmit the CG.

Continuing to take a first resource and a second resource as an example, the first resource includes a first MAC SDU and the second resource does not include MAC SDU; the first resource does not include the first MAC SDU, and the second resource includes the MAC SDU; or, the first resource does not include the first MAC SDU, and the second resource does not include the MAC SDU;
if the terminal device determines that the priority of the first logical channel corresponding to the first resource is higher than the priority of the second logical channel corresponding to the second resource according to the preset rule or by UE itself, the terminal device transmits the first resource.

In this example, when the terminal device determines according to the preset rule or the UE-determined manner, the selection is specifically based on the priority of the logical channel.

For example, if LCH1 has data to be transmitted and LCH2 has no data to be transmitted, LCH1 may be transmitted in CG, LCH2 may be transmitted in DG, and LCH1 has a higher priority than LCH2. Since there is no LCH which has data to be transmitted on the DG, only MAC CE and/or padding may be transmitted. Then, the UE determines that the LCH with a prioritized transmission is LCH1, and the resource with a prioritized transmission is CG, because CG has LCH with a higher priority.

On the basis of the above embodiment, it is worth noted that in the present embodiment the priority of the first logical channel is the priority of the logical channel with the highest priority of the MAC SDU among the MAC PDUs corresponding to the first resource, and/or the priority of the second logical channel is the priority of the logical channel with the highest priority of the MAC SDU among the MAC PDUs corresponding to the second resource.

Specifically, the MAC PDU of the first resource may include multiple MAC SDUs, which may correspond to multiple logical channels. In the present embodiment, the priority of the first logical channel is the priority of the logical channel with the highest priority.

Figure 6:
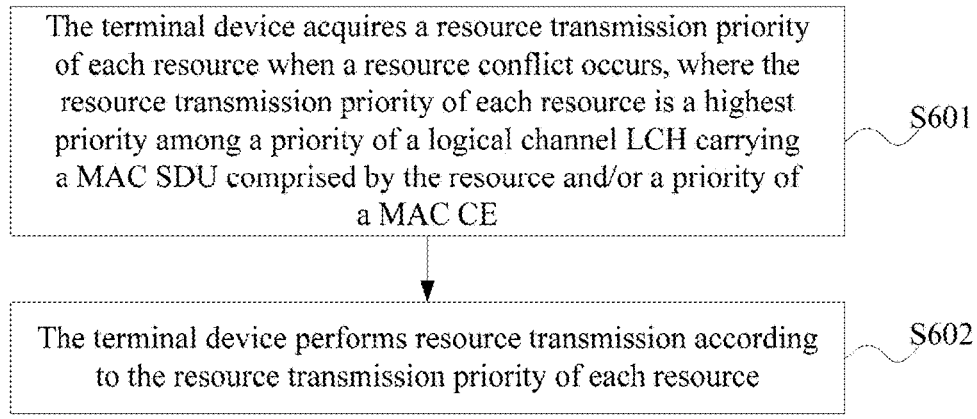
FIG. 6 is a second flowchart of a communication method provided by an embodiment of the present application.

Next, another implementation will be introduced with reference to FIG. 6. FIG. 6 is a second flowchart of a communication method provided by an embodiment of the present application.

As shown in FIG. 6, the method includes:

S601, the terminal device acquires a resource transmission priority of each resource when a resource conflict occurs, where the resource transmission priority of each resource is a highest priority among a priority of a logical channel LCH carrying a MAC SDU included by the resource and/or a priority of a MAC CE.

The implementation of S601 is similar to S301 and S302, and the similarities are not repeated in the embodiment.

The difference is that in the embodiment the resource transmission priority is the highest priority among the priority of the logical channel and/or the priority of the MAC CE, that is, for any resource, when the current resource only includes the MAC CE, the resource transmission priority of the current resource is the priority of MAC CE; when the current resource only includes the MAC SDU, the resource transmission priority of the current resource is the priority of the logical channel carrying the MAC SDU; when the current resource includes both MAC SDU and MAC CE, the resource transmission priority of the current resource is the highest priority among the priority of the logical channel carrying the MAC SDU and the priority of the MAC CE.

It can be understood that when the resource does not include MAC CE, the priority of MAC CE will not participate in the comparison of the highest priority mentioned above, or it can be understood that the priority of MAC CE is the lowest priority. And it is also the same for MAC SDU, if it does not exist, the priority can be understood as the lowest priority.

By acquiring the resource transmission priority of each resource, the current resource to be transmitted can be determined.

S602, the terminal device performs resource transmission according to the resource transmission priority of each resource.

Specifically, the implementation of S602 is similar to that of S303, and will not be repeated here.

The communication method provided by the embodiment of the present application includes: the terminal device acquires a resource transmission priority of each resource when a resource conflict occurs, where the resource transmission priority of each resource is a highest priority among a priority of a logical channel LCH carrying a MAC SDU included by the resource and/or a priority of a MAC CE. The terminal device performs resource transmission according to the resource transmission priority of each resource. By determining the resource transmission priority of the resource according to the highest priority among the priority of the logical channel corresponding to the MAC SDU and the priority of the MAC CE in the resource, the effective resource transmission is realized, so as to ensure the Qos requirements for information transmission.

First, describing the MAC CE in the present application on the basis of the above embodiments.

The following briefly describes the priority of MAC CE.

In the embodiment, the priority of the MAC CE may be configured or instructed by the network device. For example, the network device configures the priority of the MAC CE through radio resource control (RRC) or DCI; or, the priority of the MAC CE may also be predefined, which is not limited in the embodiment.

Or, the priority of the logical channel and the priority of the MAC CE are predefined; or,
    the priority of the logical channel and the priority of the MAC CE are determined by the UE; or,
    one of the priority of the logical channel and the priority of the MAC CE is configured by the network, and the other is determined by the UE or predefined.

In the embodiment, the priority of the MAC CE may be for a single MAC CE; or, the priority of the MAC CE may be for a type of MAC CEs.

MAC CE includes but is not limited to: cell-radio network temporary identity (C-RNTI) MAC CE or data from UL-common control channel (UL-CCCH);
    Configured Grant Confirmation MAC CE;
    MAC CE for BSR, with exception of BSR included for padding;
    Single Entry Power Headroom Report (PHR) MAC CE or Multiple Entry PHR MAC CE;
    data from any Logical Channel, except data from UL-CCCH;
    MAC CE for Recommended bit rate query;
    MAC CE for BSR included for padding.

For example, the priority of C-RNTI MAC CE is set to be a first priority, the priority of the confirmation MAC CE is set to be a second priority, the priority of the BSR MAC CE is set to be a third priority, etc., that is, for a single MAC CE is configured with its own priority; or the priority of C-RNTI MAC CE can be set to be a first priority, the priority of the confirmation MAC CE, the priority of the BSR MAC CE, and the priority of the PHR MAC CE can be set to be a second priority, that is, the same priority is configured for the same type of MAC CE.

In the present embodiment, the priority of the MAC CE may be for all MAC CEs, that is, all MAC CEs have the same priority; or the priority of MAC CE may be for specific MAC CE only, the specific MAC CE can be a specific MAC CE or a specific type of MAC CEs.

In the present embodiment, MAC CEs with the same priority may be further configured with sub-priority.

For example, currently configure the priority of the C-RNTI MAC CE is a first priority, and it may further configure the respective sub-priority for a single MAC CE. For example, C-RNTI MAC CE1 is the highest priority in the first priority, C-RNTI MAC CE2 is the second highest priority in the first priority . . . etc., where C-RNTI MAC CE1 refers to a specific MAC CE in the C-RNTI type MAC CE for priority selection, mapping selection, etc.

Or, in the above example, the priority of confirmation MAC CE, BSR MAC CE, and PHR MAC CE is the second priority is introduced. For example, the priority of confirmation MAC CE1 and BSR MAC CE3 may be configured as the highest of the second priority, the remaining MAC CEs corresponding to the second priority have the same priority.

The priority of the MAC CE and the priority of the LCH may be numbered uniformly or independently. According to the protocol, the priority of the current LCH ranges from 1, 2, 3, 4 . . . (where 1 represents the highest priority). Then, all MAC CEs or a specific MAC CE have a priority of 0, and 0 represents a priority higher than 1 (of course, at least one MAC CE in MAC CEs with a priority of 0 may also have a sub-priority); or, the priority of the first MAC CE is 0, the priority of the second MAC CE is 1, the priority of the third MAC CE is 2, and so on. Among them, the first, second, third, . . . MAC CE may all exist, or may not all exist. Among them, the first, second, third, . . . MAC CE may be at least one of the all MAC CEs or the above specific MAC CEs. Specifically, the first MAC CE may be C-RNTI MAC CE, and the second MAC CE may be BSR MAC CE.

For the default MAC CE, or MAC CE with no priority indication, or MAC CE with undetermined priority, which can be considered as the lowest priority, or the highest priority, or the priority is lower than any priority of LCH, or the priority is lower than the priority of the first LCH (the priority of the first LCH is a specific LCH identifier, a LCH with a specific priority value, an LCH carrying URLLC, and a LCH corresponding to a specific resource).

The following introduces several possible implementations of the priority of MAC CE.

It can be:
the priority of the C-RNTI MAC CE is higher than the priority of the confirmation MAC CE;
the priority of the confirmation MAC CE is higher than the priority of the buffer status report (BSR) MAC CE.
It can also be:
the priority of the C-RNTI MAC CE is higher than the priority of the confirmation MAC CE;
the priority of the confirmation MAC CE, the priority of the BSR MAC CE, and the priority of the power headroom report (PHR) MAC CE are the same.
It can also be:
the priority of the C-RNTI MAC CE and the priority of the confirmation MAC CE are the same;
the priority of the BSR MAC CE and the priority of the power headroom report (PHR) MAC CE are the same.
It can also be:
the priority of the C-RNTI MAC CE is higher than the priority of the confirmation MAC CE;
the priority of the confirmation MAC CE is higher than the priority of the BSR MAC CE;
the priority of the BSR MAC CE and the priority of the power headroom report (PHR) MAC CE are the same.

Those skilled in the art can understand that the priority of the MAC CE introduced above is not an absolute limit to configuration for the priority of the MAC CE. In actual applications, the configuration for the priority of the MAC CE may also be expanded according to actual needs.

On the basis of the priority of the MAC CE introduced above, the following describes several possible implementation of resource transmission priority when the resource includes the MAC SDU and/or the MAC CE.

In a possible implementation, the priority of the MAC CE can be set to be lower than the priority of logical channel;
when the first data includes the first MAC SDU, the first priority is the priority of the first logical channel; and
when the second data includes the second MAC SDU, the second priority is the priority of the second logical channel.

That is, in the embodiment, the priority of the MAC CE can be set to be lower than the priority of the LCH as a whole. It can be understood that the priority of the LCH may be instructed by the network device, or may be predefined, or may be pre-arranged by the network device with the UE through the agreement. For example, the priority numbers of the current multiple LCHs are 1, 2, 3, 4, and 5 respectively (where 1 represents the highest priority), and the priority of all MAC CE is configured with 6 through the network device instruction or pre-defined, where the priority represented by 6 is lower than that of 5, so that the priority of the MAC CE can be set to be lower than the priority of the logical channel.

When the first data includes the first MAC SDU, there is no need to consider whether the first MAC CE is included in the first data at this time because the priority of the MAC CE is lower than the priority of the MAC SDU as a whole, and the first priority is directly determined as the priority of the first logical channel, where the first logical channel is the logical channel corresponding to the first MAC SDU; when the second data includes the second MAC SDU, the second priority is the priority of the second logical channel, the implementation is similar to that of the first data.

Figure 7:
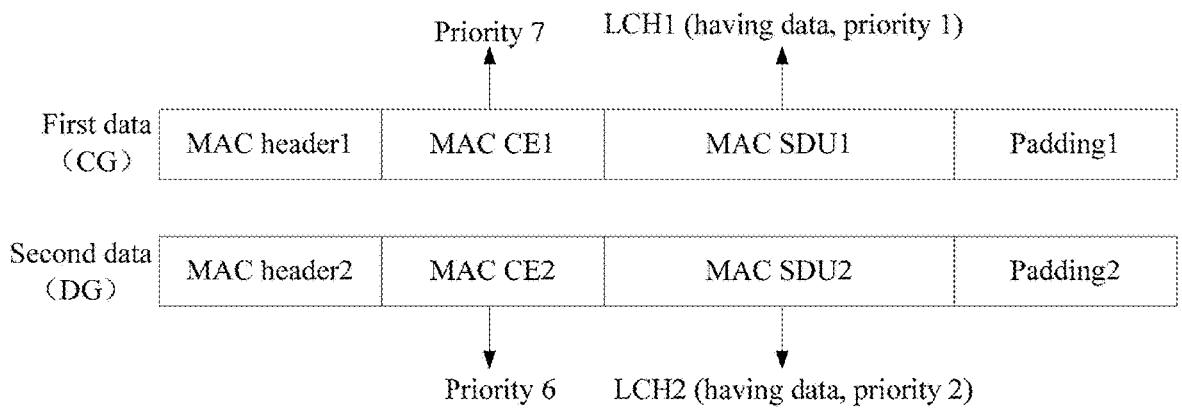
FIG. 7 is a second schematic diagram of resource transmission provided by an embodiment of the present application.

The following describes the possible implementation with a specific example with reference to FIG. 7. FIG. 7 is a second schematic diagram of resource transmission provided by an embodiment of the present application.

Assuming that there are a first resource CG and a second resource DG currently, where the first resource CG is used to transmit a first data, and the second resource DG is used to transmit a second data. The first data includes MAC SDU1 (corresponding to LCH1) and MAC CE1, and the second data includes MAC SDU2 (corresponding to LCH2) and MAC CE2. Both LCH1 and LCH2 have data to be transmitted, because the priority of MAC CE is lower than the priority of LCH as a whole, the first priority is the priority of LCH1, the second priority is the priority of LCH2, and the priority of LCH1 is higher than the priority of LCH2. And what can be determined by referring to FIG. 7 is although the priority of MAC CE2 is higher than the priority of MAC CE1, due to the priority of LCH1 is higher than the priority of LCH2, and the priority of LCH is higher than the priority of MAC CE as a whole in the example, therefore the resource with a prioritized transmission is CG at this time, correspondingly, the first data will be preferentially transmitted through CG.

In another possible implementation, the priority of MAC CE can be set to be higher than the priority of logical channel;
when the first data includes the first MAC CE, the first priority is the priority of the MAC CE; and
when the second data includes the second MAC CE, the second priority is the priority of the MAC CE.

That is, in the present embodiment, the priority of the MAC CE is set to be higher than the priority of the LCH as a whole. The priority of the LCH is similar to that described above. In the embodiment, for example, the priority numbers of the current multiple LCHs are 1, 2, 3, 4, and 5 respectively (where 1 represents the highest priority), and the priority of all MAC CEs is configured with 0 through the network device instruction or pre-defining, where the priority represented by 0 is higher than that of 1, so that the priority of the MAC CE may be set to be higher than the priority of the logical channel as a whole.

When the first data includes the first MAC CE, there is no need to consider whether the first MAC SDU is included in the first data at this time because the priority of the MAC CE is higher than the priority of the MAC SDU as a whole, and the first priority is directly determined as the priority of the first MAC CE; when the second data includes the second MAC CE, the second priority is the priority of the second MAC CE, the implementation is similar to that of the first data.

Figure 8:
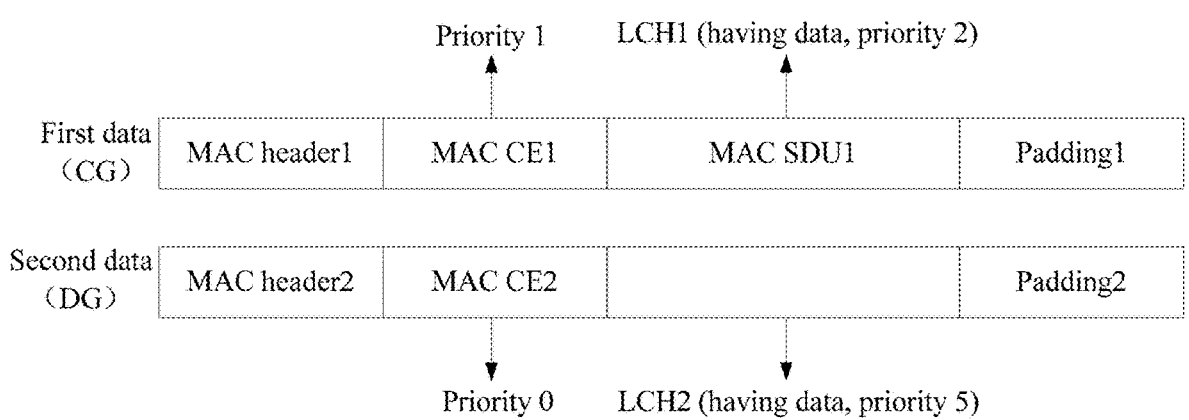
FIG. 8 is a third schematic diagram of resource transmission provided by an embodiment of the present application.

The following describes the possible implementation with a specific example with reference to FIG. 8. FIG. 8 is a third schematic diagram of resource transmission provided by an embodiment of the present application.

Assuming that there are a first resource CG and a second resource DG currently, where the first resource CG is used to transmit a first data, and the second resource DG is used to transmit a second data. There is data to be transmitted in LCH1, and there is no data to be transmitted in LCH2, the first data includes MAC CE1 and MAC SDU1, and the second data includes MAC CE2, but does not include MAC SDU, because the priority of MAC is set to be higher than the priority of LCH as a whole in the embodiment, the first priority is the priority of MAC CE1, the second priority is the priority of MAC CE2, and the priority of MAC CE2 is higher than the priority of MAC CE1. And what can be determined by referring to FIG. 8 is although the priority of LCH1 is higher than the priority of LCH2, due to the priority of the MAC CE is higher than the priority of LCH as a whole, therefore the resource with a prioritized transmission is DG at this time, correspondingly, the second data will be preferentially transmitted through DG.

In another possible implementation, in addition to setting the priority of MAC CE to be higher/lower than the priority of LCH as a whole, it can also set the priority of MAC CE and the priority of LCH to present a discrete distribution, that is, the priority of some MAC CEs can be set to be higher/lower than LCH, because in the present embodiment, it is necessary to select the highest priority among the priority of the first logical channel, the priority of the first MAC CE, the priority of the second logical channel, and the priority of the second MAC CE. The first priority and the second priority may include the following possible situations:

Situation 1

If the first data includes the first MAC SDU and the first data does not include the first MAC CE, the first priority is the priority of the first logical channel.

If the first data includes the first MAC CE, and the first data does not include the first MAC SDU, the first priority is the priority of the first MAC CE.

That is, if the first data only includes the first MAC SDU, the first priority is the priority of the first logical channel; if the first data only includes the first MAC CE, the first priority is the priority of the first MAC CE, it can be understood that when the first data does not include the first MAC CE, the priority of the first MAC CE is the lowest. At this time, the highest priority needs to be selected as the first priority, it is determined that the first priority is the priority of the first logical channel. A similar understanding can be made in another situation.

Situation 2

If the first data includes the first MAC CE and the first MAC SDU, the first priority is the maximum value among the priority of the first MAC CE and the priority of the logical channel corresponding to the first MAC SUD.

That is, if the first data includes both the first MAC CE and the first MAC SDU, the highest priority needs to be selected as the first priority, so the first priority is the maximum value among the priority of the first MAC CE and the priority of the logical channel corresponding to the first MAC SUD.

Situation 3

If the second data includes the second MAC CE and the second MAC SDU, the second priority is the maximum value among the priority of the second MAC CE and the priority of the second MAC SUD.

It is similar to the Situation 2 of the first data above, and will not be repeated here.

Situation 4

If the second data includes the second MAC SDU and the second data does not include the second MAC CE, the second priority is the priority of the second MAC SDU.

If the second data includes the second MAC CE, and the second data does not include the second MAC SDU, the second priority is the priority of the second MAC CE.

It is similar to the Situation 1 of the first data above, and will not be repeated here.

In this implementation, the difference from the above implementation is that in the above introduction, because the priority of the MAC CE is set to be higher/lower than the priority of the logical channel as a whole, the first priority and the second priority is either the priority of MAC CE or the priority of the logical channel. However, in this implementation, because the priority of the MAC CE and the priority of the logical channel are discretely distributed, it may happen that the first priority is the priority of the MAC CE and the second priority is the priority of the logical channel, and the embodiment is to select the highest priority from the current priority, and transmit the corresponding data.

Continue to use the assumption that the priority numbers of the above LCH are 1, 2, 3, 4, 5 (where 1 represents the highest priority), and for example, the network device instructs or predefines the following information: the priority of MAC CE1 is 0, and the priority of MAC CE2 is 2. At this time, only the priority of MAC CE1 is higher than the priority of the LCH, and the priority of MAC CE2 and the priority of a certain LCH are the same. It can be understood that the above MAC CE1 and MAC CE2 refer to generally, which may be a certain MAC CE or a certain type of MAC CEs, and which is not limited here.

Figure 9:
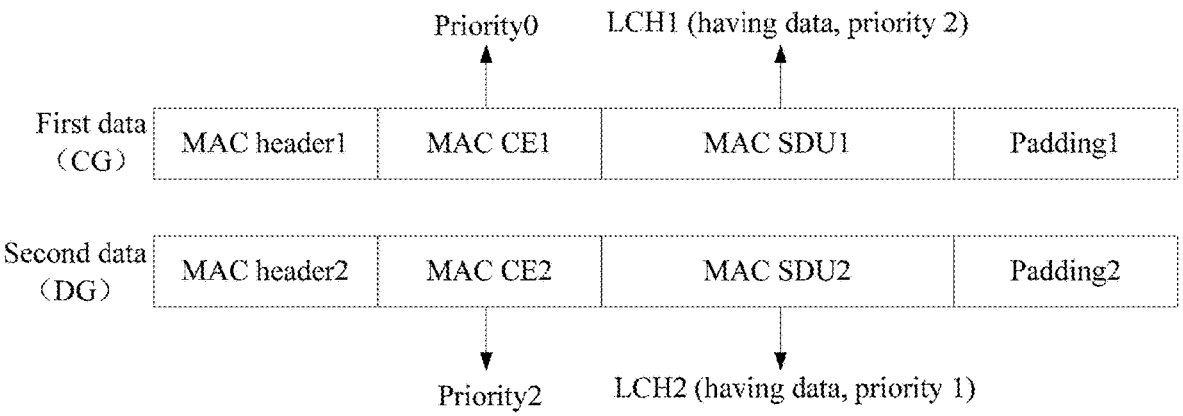
FIG. 9 is a fourth schematic diagram of resource transmission provided by an embodiment of the present application.

The following describes the possible implementation with a specific example with reference to FIG. 9. FIG. 9 is a forth schematic diagram of resource transmission provided by an embodiment of the present application.

Assuming that there are a first resource CG and a second resource DG currently, where the first resource CG is used to transmit a first data, and the second resource DG is used to transmit a second data. LCH1 and LCH2 both have data to be transmitted, the first data includes MAC CE1 and MAC SDU1, and the second data includes MAC CE2 and MAC SDU, and assuming that the priority of MAC CE1 is 0 and the priority of LCH1 is 2, then the first priority is the highest priority 0, and assuming that the priority of MAC CE2 is 2 and the priority of LCH2 is 1, then the second priority is the highest priority 1. At this time, according to the first priority and the second priority, the resource with a prioritized transmission is the CG, correspondingly, the first data will be preferentially transmitted through the CG.

For another example, the priority of the confirmation MAC CE and the C-RNTI MAC CE which carried on the CG are set to be 0, the priority of LCH1 which carried on the DG is set to be 1, and LCH has data to be transmitted, and then the UE will preferentially transmit the CG.

For another example, the priority of the BSR MAC CE which carried on the CG is set to be 2, the priority of LCH1 which carried on the DG is set to be 1, and LCH has data to be transmitted. At this time, there is no other MAC CE, and then the UE will preferentially transmit the DG.

In an optional embodiment, if there is a MAC CE with no designated priority or a MAC CE with no predefined priority, the priority of this type of MAC CE may be configured with a default value, where the default value may be, for example, the highest priority, the lowest priority, lower than the priority of any LCH, or the priority is considered to be lower than the priority of the first LCH. The priority of the first LCH is a specific LCH identifier, a LCH with a specific priority value, an LCH carrying URLLC, and a LCH corresponding to a specific resource.

In another possible implementation, the priority of the first MAC SDU, the priority of the second MAC SDU, the priority of the first MAC CE, and the priority of the second MAC CE may be also found in the preset priority list.

Specifically, the difference between the embodiment and the above embodiment is that the above embodiment needs the network device to instruct the priority of the MAC CE, or needs the network device to predefine the priority of the MAC CE. In the present embodiment, the priority information of the MAC CE and the logical channel may be determined without instruction or pre-definition of the network device by setting a preset priority list.

The preset priority list includes the priorities of multiple MAC SDUs and the priorities of multiple MAC CEs, and the priorities of the multiple MAC SDUs and the priorities of the multiple MAC CEs are agreed upon the agreement.

The following describes a possible implementation of the preset priority list with reference to Table 1.

TABLE 1

| Type |
| --- |
| C-RNTI MAC CE or data from UL-CCCH |
| Configured Grant Confirmation MAC CE |
| MAC CE for BSR, with exception of BSR included for padding |
| Single Entry PHR MAC CE or Multiple Entry PHR MAC CE |
| data from any Logical Channel, except data from UL-CCCH |
| MAC CE for Recommended bit rate query |
| MAC CE for BSR included for padding |

In Table 1 above, the information ranked first has a higher priority.

Those skilled in the art can understand that, after the priority of the MAC CE and/or the logical channel is determined by referring to the preset priority list, the specific implementation of determining the first priority and the second priority is same as that of the embodiment and its dependent embodiment in FIG. 3. The specific implementation may refer to the introduction in the above embodiment, which will not be repeated here.

In the embodiment, for data from any Logical Channel, except data from UL-CCCH, further, the UE determines the priorities of different LCHs, that is, sub-priority or LCH priority. When needed (for example, only the LCH is carried on grant, there is no MAC CE can or needs to be carried, or after comparing the priority of the MAC CE carried on the grant, it is found that the compared priority is the same etc.), determining the resource with a prioritized transmission according to at least one of the sub-priority, which LCH is carried or to be carried on the resource, and whether there is any amount of data to be transmitted.

Figure 10:
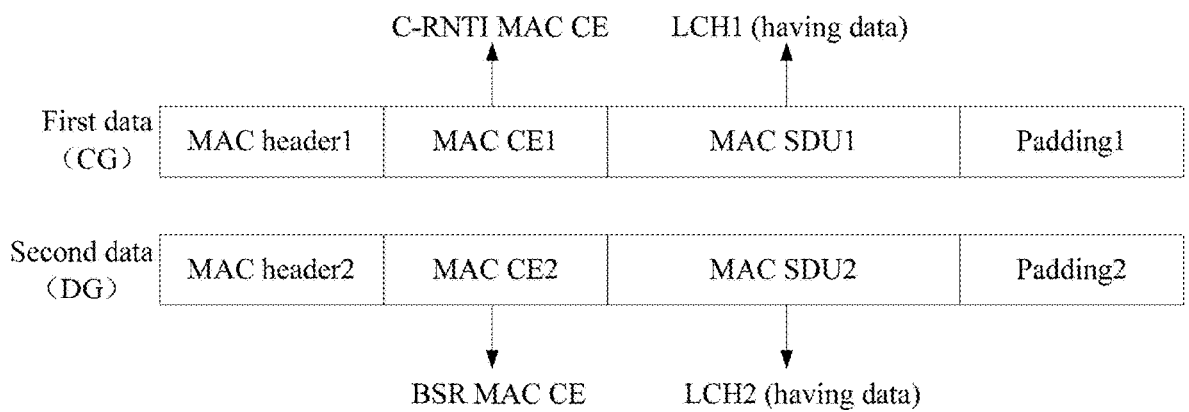
FIG. 10 is a fifth schematic diagram of resource transmission provided by an embodiment of the present application.

The following describes the implementation of determining the priority according to the preset priority list with a specific example with reference to FIG. 10. FIG. 10 is a fifth schematic diagram of resource transmission provided by an embodiment of the present application.

Assuming that there are a first resource CG and a second resource DG currently, where the first resource CG is used to transmit a first data, and the second resource DG is used to transmit a second data. LCH1 and LCH2 both have data to be transmitted, the first data includes MAC CE1 and MAC SDU1, and the second data includes MAC CE2 and MAC SDU. And assuming that MAC CE1 is specifically the C-RNTI MAC CE, and MAC CE2 is specifically the MAC CE for BSR, then referring to Table 1, it can be determined that the priority of the C-RNTI MAC CE is the highest, so the first priority is the priority of the C-RNTI MAC CE, the resource with a prioritized transmission is the CG, correspondingly, the first data will be preferentially transmitted through the CG.

For another example, LCH1 and LCH2 have data to be transmitted, LCH1 has a higher priority than LCH2, LCH1 is carried on the CG, and LCH2 is carried on the DG. Padding BSR MAC CE is carried on the DG, since the LCH has the highest priority according to the logical channel priority (LCP) priority order, and the priority of LCH1 is higher than that of LCH2, the UE will preferentially transmit the CG.

In an optional embodiment, the UE may also determine the priorities of different LCHs, that is, sub-priority or LCH priority. When needed (for example, only the MAC SDU is carried on the DG/CG, there is no MAC CE can or needs to be carried on the DG/CG, or after comparing the priority of the MAC CE carried on the DG/CG, it is found that the compared priority is the same etc.), the current resource with a prioritized transmission may be determined according to at least one of the sub-priority, which LCH is carried or to be carried on the DG/CG, and whether there is any amount of data to be transmitted.

It is worth noted that because one PDU may include multiple MAC CEs and/or multiple MAC SDUs.

The MAC CE in the present embodiment is specifically the MAC CE with the highest priority among the MAC CEs included or to be included, or the MAC CE with the lowest priority value.

And the logical channel in the embodiment is the logical channel with the highest priority among the logical channels included or to be included, or the logical channel with the lowest priority value.

Further, the above embodiment describes the resource conflict between the data channel and the data channel, or the resource conflict between the data channel and the control channel, and the present application may also resolve the resource conflict between the control channel and the control channel correspondingly.

According to the protocol R15, when PUCCH resources of multiple scheduling requests (SR) conflict, which PUCCH is selected to transmit the SR depends on the implementation of the UE. That is, when there are multiple valid PUCCH resources for transmitting the SR conflict, which valid PUCCH resource is selected to transmit the SR depends on the UE entity, specifically, which depends on the implementation of the MAC. The physical layer will only receive one SR, that is, the physical layer will not handle the case of multiple SR conflict. Details as follows.

In R16, the physical layer may handle the case of multiple SR conflict. Specifically, if the PUCCH resources of two SRs conflict, or the two SRs conflict, the PHY determines the priority resource according to the priority of the SR. The UE will drop the SR or PUCCH with low priority. At the same time, the physical layer indicates that the same method as R15 would be used when the two conflicting resources are channels or signals with low priority.

Therefore, the Note in prior art is no longer applicable to the existing situation. Therefore, in this embodiment, if the conflicting resources are the PUCCH resources of the SR, the terminal device determines the resource transmission priority of each resource according to the preset rule when the preset condition is met.

That is:

No need to retain UE implementation mechanism to select the prioritized PUCCH for the case where multiple overlapping SRs are configured with different priorities.

Specifically, the preset condition include at least one of the followings:
the priorities of the conflicting SRs are the same;
the priority levels of the conflicting SRs are the same;
the conflicting SRs all correspond to or are used to transmit a low-priority LCH/service;
the conflicting SRs all correspond to or are used to transmit a high-priority LCH/service;
the priorities of the conflicting PUCCHs corresponding to the SRs are the same;
the priority levels of the conflicting PUCCHs corresponding to the SRs are the same;
the conflicting PUCCHs corresponding to the SRs all correspond to or are used to transmit a low-priority LCH/service;
the conflicting PUCCH corresponding to the SRs all correspond to or are used to transmit a high-priority LCH/service;
all are the UL transmissions corresponding to the channels or the signals with low PHY priorities; all are the UL transmissions corresponding to the PUCCHs or the SRs with low PHY priorities;
all are the UL transmissions corresponding to the channels or the signals with high PHY priorities;
all are the UL transmissions corresponding to the PUCCHs or the SRs with high PHY priorities.

Specifically (modify the Note as follows):
NOTE 1: The selection of which valid PUCCH/SPUCCH resource for SR to signal SR on when the MAC entity has more than one valid PUCCH/SPUCCH resource for SR in one TTI or overlapping TTIs and the SRs are configured with the same priority is left to UE implementation.
NOTE 1: The selection of which valid PUCCH/SPUCCH resource for SR to signal SR on when the MAC entity has more than one valid PUCCH/SPUCCH resource for SR in one TTI or overlapping TTIs and the SRs are among low priority is left to UE implementation.
NOTE 1: The selection of which valid PUCCH/SPUCCH resource for SR to signal SR on when the MAC entity has more than one valid PUCCH/SPUCCH resource for SR in one TTI or overlapping TTIs and the PUCCH resources are with the same priority is left to UE implementation.
NOTE 1: The selection of which valid PUCCH/SPUCCH resource for SR to signal SR on when the MAC entity has more than one valid PUCCH/SPUCCH resource for SR in one TTI or overlapping TTIs and the PUCCH resources are among low priority is left to UE implementation.
NOTE 1: The selection of which valid PUCCH/SPUCCH resource for SR to signal SR on when the MAC entity has more than one valid PUCCH/SPUCCH resource for SR in one TTI or overlapping TTIs and the conflict is among with the same priority is left to UE implementation.
NOTE 1: The selection of which valid PUCCH/SPUCCH resource for SR to signal SR on when the MAC entity has more than one valid PUCCH/SPUCCH resource for SR in one TTI or overlapping TTIs and the conflict is among low priority is left to UE implementation.
NOTE 1: The selection of which valid PUCCH/SPUCCH resource for SR to signal SR on when the MAC entity has more than one valid PUCCH/SPUCCH resource for SR in one TTI or overlapping TTIs and the conflict is among high priority is left to UE implementation.

Or, in another possible implementation:
if the respective resource in conflict is a PUCCH resource of a SR or a SR resource, the communication method provided in the present application also includes:
the terminal device determines, according to a configured or designated priority, the resource with a prioritized transmission or a resource selected for transmission when a second preset condition is met.

The second preset condition includes at least one of the following:
the priority levels of the conflicting SRs are different;
the conflicting SRs respectively correspond to or are used to transmit low-priority LCH/service, and correspond to or are used to transmit a high-priority LCH/services;
the priorities of the conflicting PUCCHs corresponding to the SRs are different;
the priority levels of the conflicting PUCCHs corresponding to the SRs are different;
the conflicting PUCCHs corresponding to SRs respectively correspond to or are used to transmit a low-priority LCH/service, and correspond to or are used to transmit a high-priority LCH/service;
respectively corresponding to the UL transmission which corresponding to channels or signals with low a low PHY priority, and the UL transmission which corresponding to channels or signals with a high PHY priority;
respectively corresponding to the UL transmission which corresponding to PUCCHs or SRs with a low PHY priority, and the UL transmission which corresponding to PUCCHs or SRs with a high PHY priority.

Figure 11:
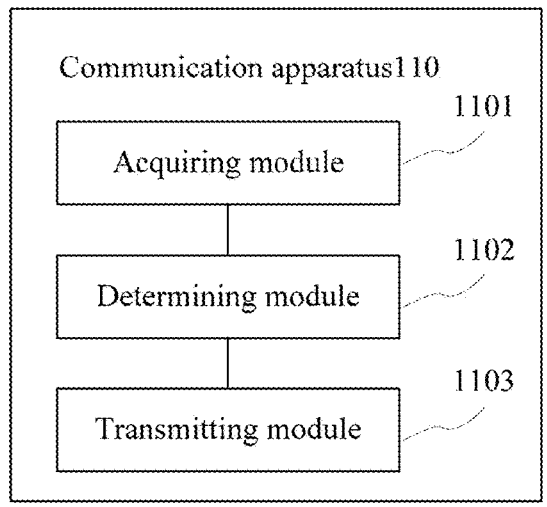
FIG. 11 is a first schematic structural diagram of a communication apparatus provided by an embodiment of the present application.

FIG. 11 is a first schematic structural diagram of a communication apparatus provided by an embodiment of the present application. Referring to FIG. 11, the communication apparatus 110 may include an acquiring module 1101, a determining module 1102 and a transmitting module 1103, where
the acquiring module 1101 is configured to acquire, by a terminal device, a composition state of a medium access control (MAC) service date unit (SDU) and a MAC control element (CE) in a MAC protocol data unit (PDU) of each resource;
the determining module 1102 is configured to determine, by the terminal device, a resource transmission priority of each resource according to the composition state of the MAC SDU and the MAC CE;
the transmitting module 1103 is configured to perform, by the terminal device, resource transmission according to the resource transmission priority of each resource.

The communication apparatus provided in the embodiment of the present application may execute the technical solutions shown in the above method embodiments, and the implementation principles and the beneficial effects therebetween are similar, which will not be repeated here.

In a possible implementation, wherein when it is determined that each resource includes the MAC SDU, the determining module 1102 is specifically configured to:
- determine, by the terminal device, a resource transmission priority of the respective resource according to a channel priority of a logical channel LCH carrying the MAC SDU.

In a possible implementation, the determining module 1102 is specifically configured to:
- when it is determined that a first priority of a LCH carrying a MAC SDU corresponding to a first resource is higher than a second priority of a LCH carrying a MAC SDU corresponding to a second resource, determine, by the terminal device, that a first transmission priority of the first resource is higher than a second transmission priority of the second resource.

In a possible implementation, when it is determined that the MAC SDU is not included in at least one resource, the determining module 1102 is specifically configured to:
- determine, by the terminal device, the resource transmission priority of the respective resource according to a preset rule.

In a possible implementation, a first resource includes a first MAC SDU, and a second resource includes a second MAC SDU;
- transmit, by the terminal device, the first resource if a channel priority of a first logical channel carrying the first MAC SDU is higher than a channel priority of a second logical channel carrying the second MAC SDU.

In a possible implementation, a first resource includes a first MAC SDU and a second resource does not include the MAC SDU; or, the first resource does not include the first MAC SDU, and the second resource includes the MAC SDU; or, the first resource does not include the first MAC SDU, and the second resource does not include the MAC SDU;
- transmit, by the terminal device, the first resource if the terminal device determines that a priority of the first resource is higher than or equal to a priority of the second resource according to a preset rule or a UE-determined manner.

In a possible implementation, the first resource includes a first MAC SDU and the second resource does not include MAC SDU; or the first resource does not include the first MAC SDU, and the second resource includes the MAC SDU; or, the first resource does not include the first MAC SDU, and the second resource does not include the MAC SDU;
- transmit, by the terminal device, the first resource if the terminal device determines that a priority of a first logical channel corresponding to the first resource is higher than a priority of a second logical channel corresponding to the second resource according to a preset rule or a UE-determined manner.

In a possible implementation, the type of the resource at least includes configured grant (CG) resource, and dynamic scheduling (DG) resource.

In a possible implementation, wherein a priority of the first logical channel is a priority of a logical channel with a highest priority of a MAC SDU among a MAC PDU corresponding to the first resource, and/or a priority of the second logical channel is a priority of a logical channel with the highest priority of a MAC SDU among a MAC PDU corresponding to the first resource.

Figure 12:
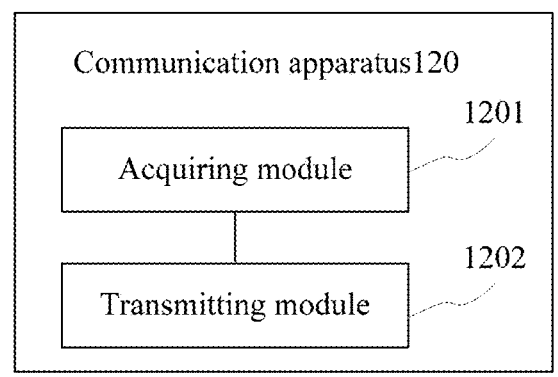
FIG. 12 is a second schematic structural diagram of a communication apparatus provided by an embodiment of the present application.

FIG. 12 is a second schematic structural diagram of a communication apparatus provided by an embodiment of the present application. Referring to FIG. 12, the communication apparatus 120 may include an acquiring module 1201 and a transmitting module 1202, where
- the acquiring module 1201 is configured to acquire, by a terminal device, a resource transmission priority of each resource when a resource conflict occurs, wherein the resource transmission priority of each resource is a highest priority among a priority of a logical channel LCH carrying a MAC SDU included by the resource and/or a priority of a MAC CE;
- the transmitting module 1202 is configured to perform, by the terminal device, resource transmission according to the resource transmission priority of each resource.

The communication apparatus provided in the embodiment of the present application may execute the technical solutions shown in the above method embodiments, and the implementation principles and beneficial effects therebetween are similar, which will not be repeated here.

In a possible implementation, the resource includes the MAC SDU and/or the MAC CE.

In a possible implementation, the priority of the logical channel and the priority of the MAC CE are configured or instructed by a network device; or,
- the priority of the logical channel and the priority of the MAC CE are predefined; or,
- the priority of the logical channel and the priority of the MAC CE are determined by the UE; or,
- one of the priority of the logical channel and the priority of the MAC CE is configured by the network, and the other is determined by the UE or predefined.

In a possible implementation, the priority of MAC CE is lower than the priority of logical channel;
- when the first data includes the first MAC SDU, the first priority of the first data is the priority of the first logical channel, and/or, when the first data does not include the first MAC SDU, the first priority is the priority of the first MAC CE.

In a possible implementation, the priority of the MAC CE is lower than the priority of the logical channel;
- when the second data includes the second MAC SDU, the second priority is the priority of the second logical channel, and/or when the second data does not include the second MAC SDU, the first priority is the priority of the second MAC CE.

In a possible implementation, the priority of the MAC CE is higher than the priority of the logical channel;
- when the first data includes the first MAC CE, the first priority is the priority of the first MAC CE, and/or when the first data does not include the first MAC CE, the first priority is the priority of the first logical channel.

In a possible implementation, the priority of the MAC CE is higher than the priority of the logical channel;
- when the second data includes the second MAC CE, the second priority is the priority of the second MAC CE, and/or when the second data does not include the second MAC CE, the first priority is the priority of the second logical channel.

In a possible implementation, a priority of a first MAC SDU, a priority of a second MAC SDU, a priority of the first MAC CE, and a priority of the second MAC CE are inquired from a preset priority list, or determined according to their orders in a preset priority list.

In a possible implementation, the preset priority list includes the priorities of multiple MAC SDUs and the priorities of multiple MAC CEs, and the priorities of the multiple MAC SDUs and the priorities of the multiple MAC CEs are agreed upon the agreement.

In a possible implementation, the first data includes the first MAC SDU, and the first data does not include the first MAC CE, and the first priority is the priority of the first logical channel.

In a possible implementation, the first data includes the first MAC CE, and the first data does not include the first MAC SDU, and the first priority is the priority of the first MAC CE.

In a possible implementation, the first data includes the first MAC CE and the first MAC SDU, and the first priority is the highest priority among the priority of the first MAC CE and the priority of the logical channel corresponding to the first MAC SUD, or the priority with the lowest priority value.

In a possible implementation, the second data includes the second MAC SDU, and the second data does not include the second MAC CE, and the second priority is the priority of the second MAC SDU.

In a possible implementation manner, the second data includes the second MAC CE, and the second data does not include the second MAC SDU, and the second priority is the priority of the second MAC CE.

In a possible implementation, the second data includes the second MAC CE and the second MAC SDU, and the second priority is the highest priority among the priority of the second MAC CE and the priority of the second MAC SUD, or the priority with the lowest priority value.

In a possible implementation manner, the priority of cell radio network temporary identification (C-RNTI) MAC CE is higher than the priority of the confirmation MAC CE;
the priority of the confirmation MAC CE is higher than the priority of the buffer status report (BSR) MAC CE.

In a possible implementation, the priority of C-RNTI MAC CE is higher than the priority of confirmation MAC CE;
the priority of the confirmation MAC CE, the priority of the BSR MAC CE, and the priority of power headroom report (PHR) MAC CE are the same.

In a possible implementation, the priority of the C-RNTI MAC CE and the priority of the confirmation MAC CE are the same;
the priority of the BSR MAC CE and the priority of the power headroom report (PHR) MAC CE are the same.

In a possible implementation, the priority of the C-RNTI MAC CE is higher than the priority of the confirmation MAC CE;
the priority of the confirmation MAC CE is higher than the priority of the BSR MAC CE;
the priority of the BSR MAC CE and the priority of the power headroom report (PHR) MAC CE are the same.

In a possible implementation, the first MAC CE and/or the second MAC CE is the MAC CE with the highest priority among the MAC CEs included or to be included, or the MAC CE with the lowest priority value.

In a possible implementation, the first logical channel and/or the second logical channel is the logical channel with the highest priority among the logical channels included or to be included, or the logical channel with the lowest priority value.

In a possible implementation, if the respective resource in conflict is the physical uplink control channel (PUCCH) resource of the scheduling request (SR), the determining module is further configured to:

determine, by the terminal device, the resource transmission priority of the respective resource according to a preset rule when a first preset condition is met.

In a possible implementation, the first preset condition includes at least one of the followings:
the priorities of the conflicting SRs are the same;
the priority levels of conflicting SRs are the same;
the conflicting SRs all correspond to or are used to transmit a low-priority LCH/service;
the conflicting SRs all correspond to or are used to transmit a high-priority LCH/service;
the priorities of the conflicting PUCCHs corresponding to the SRs are the same;
the priority levels of the conflicting PUCCHs corresponding to the SRs are the same;
the conflicting PUCCHs corresponding to the SRs all correspond to or are used to transmit a low-priority LCH/service;
the conflicting PUCCH corresponding to the SRs all correspond to or are used to transmit a high-priority LCH/service;
all are the UL transmissions corresponding to the channels or the signals with low PHY priorities;
all are the UL transmissions corresponding to the PUCCHs or the SRs with low PHY priorities;
all are the UL transmissions corresponding to the channels or the signals with high PHY priority;
all are the UL transmissions corresponding to the PUCCHs or the SRs with high PHY priorities.

In a possible implementation, if the respective resource in conflict is a PUCCH resource of a SR or a SR resource, the determining module is further configured to:
determine, by the terminal device, according to a configured or designated priority, a resource with a prioritized transmission or a resource selected for transmission when a second preset condition is met.

In a possible implementation, the second preset condition includes at least one of the following:
the priority levels of the conflicting SRs are different;
the conflicting SRs respectively correspond to or are used to transmit a low-priority LCH/service, and correspond to or are used to transmit a high-priority LCH/service;
the priorities of the conflicting PUCCHs corresponding to the SRs are different;
the priority levels of the conflicting PUCCHs corresponding to the SRs are different;
the conflicting PUCCHs corresponding to SRs respectively correspond to or are used to transmit a low-priority LCH/service, and correspond to or are used to transmit a high-priority LCH/service;
respectively corresponding to the UL transmission which corresponding to channels or signals with a low PHY priority, and the UL transmission which corresponding to channels or signals with a high PHY priority;
respectively corresponding to the UL transmission which corresponding to PUCCHs or SRs with a low PHY priority, and the UL transmission which corresponding to PUCCHs or SRs with a high PHY priority.

Figure 13:
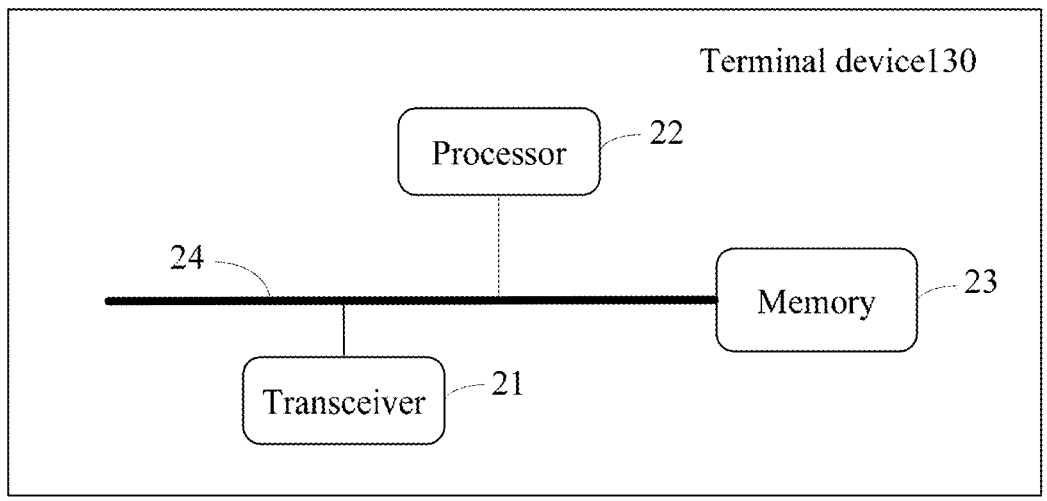
FIG. 13 is a schematic structural diagram of a terminal device provided by an embodiment of the present application.

FIG. 13 is a schematic structural diagram of a terminal device provided by an embodiment of the present application. Referring to FIG. 13, the terminal device 20 may include a transceiver 21, a memory 22, and a processor 23. The transceiver 21 may include a transmitter and/or a receiver. The transmitter can also be referred to as a sender, a transmitting machine, a transmitting port, or a transmitting interface and other similar descriptions, and the receiver can also be referred to as a receiver, a receiving machine, a receiving port, or a receiving interface and other similar descriptions. Illustratively, the transceiver 21, the memory 22, and the processor 23 are connected to each other through a bus 24.

The memory 22 is used to store program instructions;

the processor 23 is configured to execute the program instructions stored in the memory, so that enable the terminal device 20 to execute any of the communication methods shown above.

The receiver of the transceiver 21 may be used to perform the receiving function of the terminal device in the above communication method.

The embodiment of the present application provides a computer-readable storage medium, and the computer-readable storage medium stores a computer-executable instruction, and when the computer-executable instruction is executed by a processor, it is used to implement the above communication method.

The embodiments of the present application may also provide a computer program product, which can be executed by a processor, and when the computer program product is executed, it can implement the communication method executed by any of the above terminal devices.

The terminal device, computer-readable storage medium, and computer program product of the embodiments of the present application can execute the communication method executed by the above terminal device. The specific implementation process and beneficial effects may refer to the above, which will not be repeated here.

In the several embodiments provided in the present application, it should be understood that the disclosed system, apparatus, and method may be implemented in other ways. For example, the apparatus embodiments described above are only illustrative. For example, the division of the units is only a logical function division, and there may be other divisions in actual implementation, for example, multiple units or components may be combined or may be integrated into another system, or some features can be ignored or not implemented. In addition, the displayed or discussed mutual coupling or direct coupling or communication connection may be through some interfaces, the indirect coupling or communication connection of the apparatus or unit can be electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to realize the objective of the solution of the present embodiment.

In addition, the functional units in the various embodiments of the present application may be integrated into one processing unit, or each unit may independent physically, or two or more units may be integrated into one unit. The above integrated unit may be implemented in the form of hardware or software functional unit.

The ordinary skilled in the art can understand that all or part of the steps in the above method embodiments may be implemented by hardware related with program instruction. The above computer program can be stored in a computer readable storage medium. When the computer program is executed by the processor, it realizes the steps including the above method embodiments; and the above storage medium includes: ROM, RAM, magnetic disk, or optical disk and other media that can store program codes.

Finally, it should be noted that the above embodiments are only used to illustrate the technical solutions of the present application, but not the limitation to the present application; although the present application has been described in detail with reference to the above embodiments, the ordinary skilled in the art should understand that the technical solutions described in the above embodiments may still be modified, or some or all of the technical features may be equivalently replaced; and these modifications or replacements do not make the essence of the corresponding technical solutions depart from the scope of the technical solutions of the embodiments of the present application.

What is claimed is:

1. A communication method, comprising:
   acquiring, by a terminal device, a composition state of a medium access control (MAC) service date unit (SDU) and a MAC control element (CE) in a MAC (protocol data unit) PDU of each resource when a resource conflict occurs;
   determining, by the terminal device, a resource transmission priority of each resource according to the composition state of the MAC SDU and the MAC CE; and
   performing, by the terminal device, resource transmission according to the resource transmission priority of each resource;
   wherein when it is determined that the MAC SDU is not comprised in at least one resource, determining, by the terminal device, the resource transmission priority of each resource according to the composition state of the MAC SDU and the MAC CE comprises:
   determining, by the terminal device, the resource transmission priority of each resource according to a preset rule.

2. The method according to claim 1, wherein when it is determined that each resource comprises the MAC SDU, determining, by the terminal device, the resource transmission priority of each resource according to the composition state of the MAC SDU and the MAC CE comprises:
   determining, by the terminal device, a resource transmission priority of each resource according to a priority of a logical channel (LCH) carrying the MAC SDU.

3. The method according to claim 2, wherein determining, by the terminal device, the resource transmission priority of each resource according to the priority of the LCH carrying the MAC SDU comprises:
   when it is determined that a first priority of a LCH carrying a MAC SDU corresponding to a first resource is higher than a second priority of a LCH carrying a MAC SDU corresponding to a second resource, determining, by the terminal device, that a first transmission priority of the first resource is higher than a second transmission priority of the second resource.

4. The method according to claim 1, wherein a first resource comprises a first MAC SDU, and a second resource comprises a second MAC SDU; performing, by the terminal device, resource transmission according to the resource transmission priority of each resource comprises:
   transmitting, by the terminal device, the first resource if a priority of a first logical channel carrying the first MAC SDU is higher than a priority of a second logical channel carrying the second MAC SDU.

5. The method according to claim 1, wherein a first resource comprises a first MAC SDU and a second resource does not comprise a MAC SDU; performing, by the terminal device, resource transmission according to the resource transmission priority of each resource comprises:
   transmitting, by the terminal device, the first resource if the terminal device determines that a priority of the first resource is higher than or equal to a priority of the second resource according to the preset rule.

6. The method according to claim 1, wherein a first resource comprises a first MAC SDU and a second resource does not comprise a MAC SDU; or, a first resource does not comprise a MAC SDU, and a second resource comprises a second MAC SDU; or, a first resource does not comprise a MAC SDU, and the second resource does not comprise a MAC SDU; performing, by the terminal device, resource transmission according to the resource transmission priority of each resource comprises:
transmitting, by the terminal device, the first resource if the terminal device determines that a priority of a first logical channel corresponding to the first resource is higher than a priority of a second logical channel corresponding to the second resource according to the preset rule or a UE-determined manner.

7. The method according to claim 1, wherein a type of the resource at least comprises a configured grant (CG) resource and a dynamic grant (DG) resource.

8. The method according to claim 4, wherein a priority of the first logical channel is a priority of a logical channel with a highest priority of a MAC SDU among a MAC PDU corresponding to the first resource.

9. A communication apparatus, comprising: a transceiver, a processor and a memory;
the memory stores computer executable instructions;
the processor executes the computer executable instructions in the memory, so that the processor is configured to:
acquire a composition state of a medium access control (MAC) service date unit (SDU) and a MAC control element (CE) in a MAC protocol data unit (PDU) of each resource when a resource conflict occurs;
determine a resource transmission priority of each resource according to the composition state of the MAC SDU and the MAC CE;
perform resource transmission according to the resource transmission priority of each resource;
wherein when it is determined that the MAC SDU is not comprised in at least one resource, the processor is specifically configured to:
determine the resource transmission priority of each resource according to a preset rule.

10. The apparatus according to claim 9, wherein when it is determined that each resource comprises the MAC SDU, the processor is specifically configured to:
determine a resource transmission priority of each resource according to a priority of a logical channel (LCH) carrying the MAC SDU.

11. The apparatus according to claim 10, wherein the processor is specifically configured to:
when it is determined that a first priority of a LCH carrying a MAC SDU corresponding to a first resource is higher than a second priority of a LCH carrying a MAC SDU corresponding to a second resource, determine that a first transmission priority of the first resource is higher than a second transmission priority of the second resource.

12. The apparatus according to claim 9, wherein a first resource comprises a first MAC SDU, and a second resource comprises a second MAC SDU; the processor is specifically configured to:

transmit the first resource if a priority of a first logical channel carrying the first MAC SDU is higher than a priority of a second logical channel carrying the second MAC SDU.

13. The apparatus according to claim 9, wherein a first resource comprises a first MAC SDU and a second resource does not comprise a MAC SDU; the processor is specifically configured to:
transmit the first resource if the terminal device determines that a priority of the first resource is higher than or equal to a priority of the second resource according to the preset rule.

14. The apparatus according to claim 9, wherein a first resource comprises a first MAC SDU and a second resource does not comprise a MAC SDU; or, a first resource does not comprise a MAC SDU, and a second resource comprises a second MAC SDU; or, a first resource does not comprise a MAC SDU, and the second resource does not comprise a MAC SDU; the processor is specifically configured to:
transmit the first resource if the terminal device determines that a priority of a first logical channel corresponding to the first resource is higher than a priority of a second logical channel corresponding to the second resource according to the preset rule or a UE-determined manner.

15. The apparatus according to claim 9, wherein a type of the resource at least comprises a configured grant (CG) resource and a dynamic grant (DG) resource.

16. The apparatus according to claim 12, wherein a priority of the first logical channel is a priority of a logical channel with a highest priority of a MAC SDU among a MAC PDU corresponding to the first resource.

17. A non-transitory computer-readable storage medium, wherein the non-transitory computer-readable storage medium stores computer-executable instructions thereon, and when a processor executes the computer-executable instructions, the processor is configured to:
acquire a composition state of a medium access control (MAC) service date unit (SDU) and a MAC control element (CE) in a MAC protocol data unit (PDU) of each resource when a resource conflict occurs;
determine a resource transmission priority of each resource according to the composition state of the MAC SDU and the MAC CE;
perform resource transmission according to the resource transmission priority of each resource;
wherein when it is determined that the MAC SDU is not comprised in at least one resource, the processor is specifically configured to:
determine the resource transmission priority of each resource according to a preset rule.

18. The non-transitory computer-readable storage medium according to claim 17, when it is determined that each resource comprises the MAC SDU, the processor is specifically configured to:
determine a resource transmission priority of each resource according to a priority of a logical channel (LCH) carrying the MAC SDU.

\* \* \* \* \*